Oct. 11, 1966  R. W. GODET  3,277,706
WIND DIRECTION AND VELOCITY INDICATOR
Filed Aug. 26, 1963  3 Sheets-Sheet 1

INVENTOR.
Richard W. Godet
BY Harold E. Cole
Attorney

Oct. 11, 1966   R. W. GODET   3,277,706
WIND DIRECTION AND VELOCITY INDICATOR
Filed Aug. 26, 1963
3 Sheets-Sheet 2
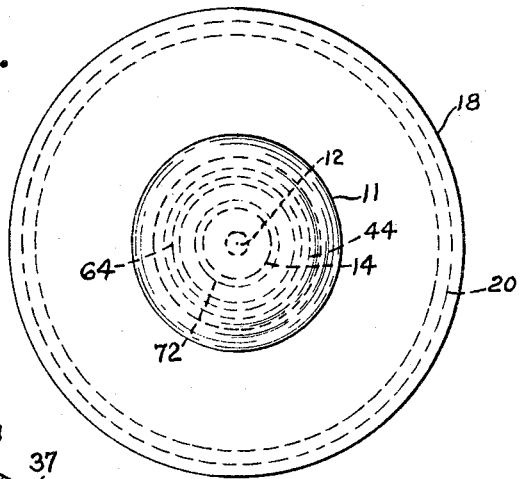
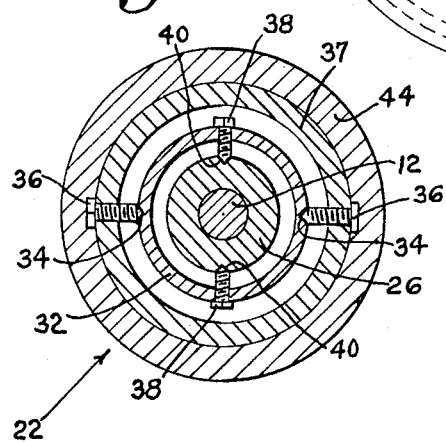
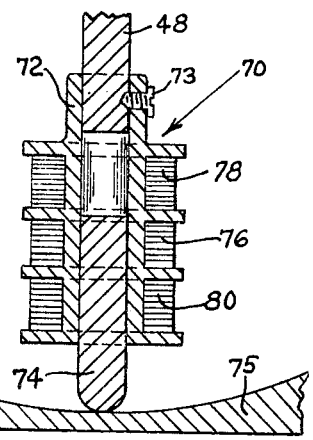
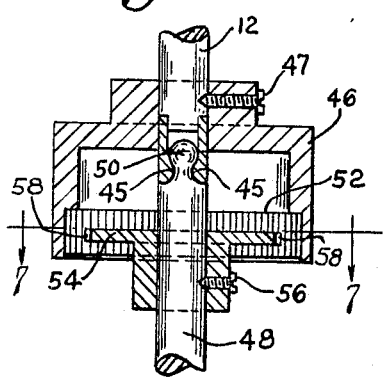
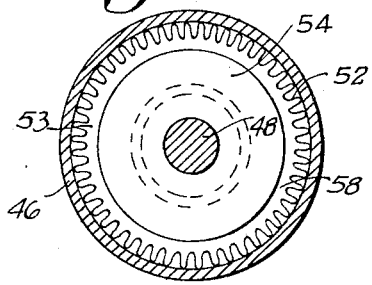
INVENTOR.
Richard W. Godet
BY Harold E. Cole
Attorney Oct. 11, 1966  R. W. GODET  3,277,706
WIND DIRECTION AND VELOCITY INDICATOR
Filed Aug. 26, 1963  3 Sheets-Sheet 3

INVENTOR.
Richard W. Godet
BY Harold E. Cole
Attorney

United States Patent Office 3,277,706
Patented Oct. 11, 1966

3,277,706
WIND DIRECTION AND VELOCITY INDICATOR
Richard W. Godet, Merrimac, Mass., assignor of one-half to Fred C. Meichsner, Quincy, Mass.
Filed Aug. 26, 1963, Ser. No. 304,349
3 Claims. (Cl. 73—189)

This invention relates to an indicator to indicate both wind direction and velocity, or either alone.

One object of my invention is to provide an indicator that is constructed with a relatively small number of parts that are simple to assemble and reliable in operation.

Another object is to provide electrical apparatus to thereby obtain readings of wind directions by the use of a resistor in operable association with a movable contact member whereby different wind directions are indicated as different parts of the resistor are contacted.

Still another object is to provide electrical apparatus to thereby obtain wind velocity readings by the use of a differential transformer having a core that moves on the surface of a dish-shaped member and thereby moves upwardly and downwardly in said transformer as said core travels on surfaces varying in height.

A further object is to provide such an indicator that is accurate and durable and yet can be manufactured at a relatively low cost.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

FIG. 2 is a top plan view of said indicator.

FIG. 3 is an enlarged, sectional view taken on the line 3—3 of FIG. 1.

FIG. 4 is an enlarged, sectional view taken on the line 4—4 of FIG. 1.

FIG. 5 is an enlarged, sectional view taken on the line 5—5 of FIG. 1.

FIG. 7 is a sectional view taken on the line 7—7 of FIG. 5.

Figure 1:
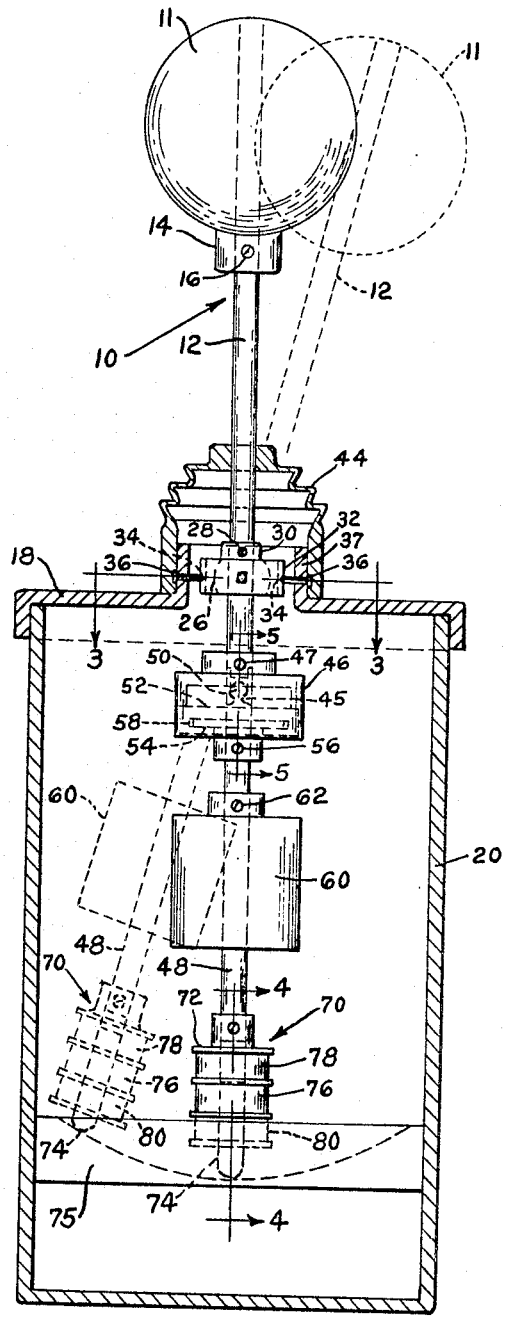
FIG. 1 is a front elevational view of my indicator, the housing and mounting cover being shown in section, and the dash lines showing the positions of the shafts when my indicator responds to the blowing of the wind.

As illustrated, my indicator has a wind displaceable transmitter 10, that has a wind responsive sphere 11 which presents a uniform, exposed surface throughout. It also has a shaft 12 to which said sphere 11 is attached by means of a collar 14 held to the shaft by a set screw 16. A support or mounting 18 is shown as a cover for a housing or protective casing 20.

Said shaft 12 may tilt or swivel anywhere within a 360-degree movement by swiveling retainer means 22 having a retainer member 26, the main body of which is circular, which is held to the shaft by a set screw 28 extending through its neck 30. Said retainer means includes a pivoting ring 32 surrounding, and normally spaced from said retainer member 26 and which has two indents 34 therein. Two retaining screws 36 screw-threadedly connect with and extend through an extension or neck 37 of said mounting 18 and enter said indents 34. Two other retaining screws 38 screw-threadedly connect and extend through said pivoting ring 32 and enter indents 40 in said retaining member 26. When wind blows against said sphere 11 said shaft 12 freely moves or tilts to the extent permitted by said retainer means 22. A weather-protecting, flexible cover 44 is outside of and cemented to said extension 37.

Said shaft 12 extends below said retainer member 26, terminating in a socket 45. An insulating cover 46 is held by a set screw 47 to the shaft 12 and extends below the latter.

Another shaft 48 has an integral ball swivel member 50 at one end that movably extends into said socket 45. Said swivel member 50 is preferably set close to said socket 45 and still has free movement in all directions. A wind direction indicating means has a resistor 52, that is wire wound, and is held, as by cement to said insulating cover 46. A metal disc contact member 54 is fastened to said other shaft 48 by a set screw 56 and is normally spaced as at 58 from said resistor 52 to thereby provide a variable potentiometer. Since said resistor is wound in various directions, when said disc contact 54 touches it, caused by tilting movement of said shafts, a circuit is closed as later explained. This causes electrical current, which is variable depending upon which part of the resistor is contacted by the disc, to flow to a meter 102, later described, that accurately indicates the direction of the wind. The meter 102 is calibrated with said resistor 52 so that any portion of said resistor contacted by said contact disc 54 establishes a certain electrical current which varies as different portions are contacted. This results in a movement of an indicator 103 on said meter 102 to thereby point out the direction of the wind.

As different portions of the resistor are contacted, different readings are given, hence a correct reading is obtained whichever way the wind is blowing. A weight 60 is attached to said other shaft 48 by a set screw 62 to serve as a counter balance.

Wind velocity indicating means includes a differential transformer 70 having a non-magnetic sleeve 72 attached by a set screw 73 to the outer end portion of said other shaft 48 and which may be 1/16 inch thick for instance. An iron core 74 slidably extends into said sleeve 72, being spaced from the end of said other shaft 48. This core 74 is movable on and is always in contact with a dish-shaped member 75. A primary coil 76 is wound around said sleeve 72, being normally energized from an outside source of electricity. There are two secondary coils 78 and 80, which are at opposite sides of said primary coils 76, one being wound clockwise and the other counter clockwise.

Figure 6:
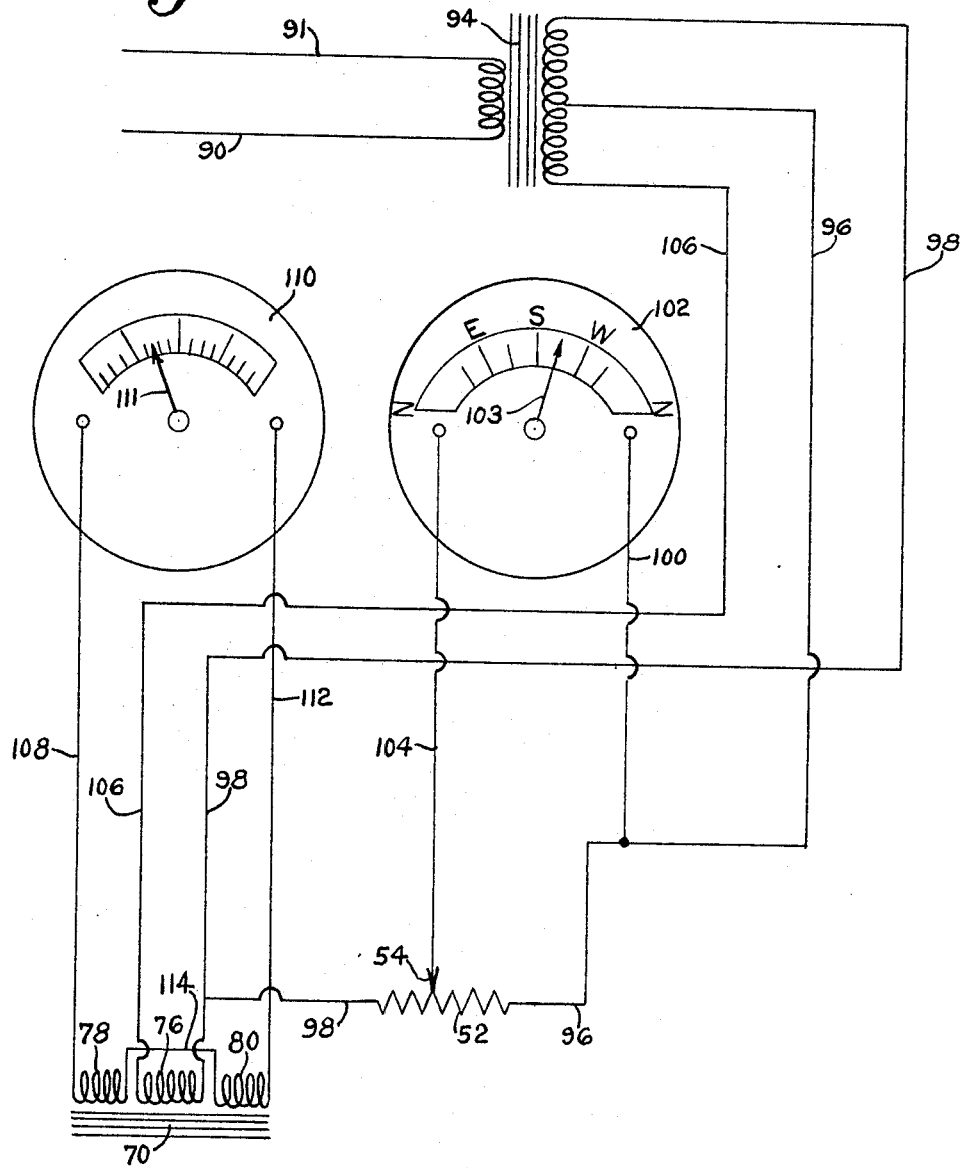
FIG. 6 is an electrical wiring diagram showing the circuit connections of my indicator.

In FIG. 6 a wiring diagram is shown in which electric current flows from an outside source, not shown, by means of wires 90 and 91, which are connected to a well-known power or step-down transformer 94 with a magnetic core. The latter reduces the current to provide lower voltage, such as 6 volts, or whatever current is desired, to supply said resistor 52, and also provides other voltage, such as 14 volts, to supply said differential transformer 70.

A wire 96 extends from said transformer 94 to said variable resistor 52 and then returns through wire 98 to said transformer 94. Another wire 100 connects with said wire 96 and with said wind direction meter 102. Also a wire 104 extends from the latter to said metal contact disc which closes a circuit to said meter 102 when said metal disc 54 contacts said variable resistor 52.

From said resistor 52 said wire 98 also extends to said primary coil 76 of said differential transformer 70 to thus serve as a common return wire.

A lead wire 106 extends from said transformer 94 to said primary coil 76. Another wire 108 extends from said secondary coil 78 to a meter 110 having an indicator 111 that gives wind velocity readings. Another wire 112 extends from said meter 110 to said secondary coil 80 and then a wire 114 connects the latter to said secondary coil 78.

When said iron core 74 is in the position shown in FIGS. 1 and 4 of the drawings, being opposite said primary coil 76 and said secondary coil 80, the wind velocity meter 110 is so calibrated that the reading is zero. However, blowing of the wind will move said iron core towards the periphery of said dish-shaped member 75 thus causing said core to rise and move opposite a portion of said secondary coil 78, as shown by dash lines in said FIG. 1, which reduces the flow of electrical current to said meter 110. And as movement of the core continues, this further movement steadily reduces the current to meter 110. When the core is opposite the whole of said secondary coil 78, electrical current ceases, and at this point a maximum reading of wind velocity is given on said meter 110.

If wind direction readings only are desired then both shafts 12 and 48 can be used as shown; but the differential transformer is not included until such time as wind velocity readings are desired. However, if the latter readings are not desired at any time then a single shaft is sufficient to obtain wind direction readings, in which event said shaft 12 will extend through said resistor 52, and the weight 60 attached to it.

If wind velocity readings only are desired then one shaft 12 only is used which would extend to the differential transformer 70, and the wind direction indicating means would be omitted.

What I claim is:

1. A wind velocity indicator comprising a wind displaceable transmitter having a shaft, a wind responsive sphere attached to said shaft, a mounting, retainer means connected to said shaft swivelly supported by said mounting and movably retaining said shaft to said mounting, and wind velocity indicating means connected to said shaft and adapted upon actuation of said transmitter to indicate the velocity of the wind, said velocity indicating means embodying a differential transformer attached to said shaft having a non-magnetic sleeve, a primary coil and two secondary coils at opposite sides of said primary coil and extending around said sleeve, a core movably extending into said sleeve, a dish-shaped member below and normally in contact with said core, said core being moved relative to said secondary coils by said dish-shaped member when said shaft is displaced by the wind, a meter to indicate wind velocity, and electricity conducting means connected to said meter and to said secondary coils to establish an electrical circuit therethrough to thereby indicate varying degrees of wind velocity on said wind velocity meter as said core travels on said dish-shaped member in response to changing velocity of the wind.

2. A wind direction and velocity indicator comprising a wind displaceable transmitter having a shaft, a wind responsive sphere attached to said shaft, a mounting, retainer means connected to said shaft swivelly supported by said mounting and movably retaining said shaft to said mounting, wind direction indicating means connected to said shaft and adapted upon actuation of said transmitter to indicate the direction the wind blows, another shaft movably connected to said first shaft, and wind velocity indicating means connected to said other shaft and adapted upon actuation of said transmitter to indicate the velocity of the wind, said wind direction indicating means embodying a resistor, a movable contact ring within said resistor and normally spaced from said resistor and attached to said other shaft and adapted to contact various portions of said resistor upon movement of said other shaft, a wind direction indicating meter, electricity conducting means connected to said meter, resistor and contact member to establish an electrical circuit therethrough and thereby indicate wind direction whenever said contact member contacts said resistor, said velocity indicating means embodying a differential transformer attached to said shaft having a non-magnetic sleeve, a primary coil and two secondary coils at opposite sides of said primary coil and extending around said sleeve, a core movably extending into said sleeve, a dish-shaped member below and normally in contact with said core, said core being moved relative to said secondary coils by said dish-shaped member when said shaft is displaced by the wind, a meter to indicate wind velocity, and electricity conducting means connected to said meter and to said secondary coils and adapted to establish an electrical circuit therethrough to thereby indicate varying degrees of wind velocity on said wind velocity meter as said core travels on said dish-shaped member in response to changing velocity of the wind.

3. A wind direction and velocity indicator comprising a wind displaceable transmitter having a shaft, a wind responsive sphere attached to said shaft, a mounting, retainer means connected to said shaft swivelly supported by said mounting and movably retaining said shaft to said mounting, wind direction indicating means connected to said shaft and adapted upon actuation of said transmitter to indicate the direction the wind blows, another shaft movably connected to said first shaft, and wind velocity indicating means connected to said other shaft and adapted upon actuation of said transmitter to indicate the velocity of the wind, said velocity indicating means embodying a differential transformer attached to said other shaft having a non-magnetic sleeve, a primary coil and two secondary coils at opposite sides of said primary coil and extending around said sleeve, a core movably extending into said sleeve, a dish-shaped member below and normally in contact with said core, said core being moved relative to said secondary coils by said dish-shaped member when said shaft is displaced by the wind, a meter to indicate wind velocity, and electricity conducting means connected to said meter and to said secondary coils to establish an electrical circuit therethrough to thereby indicate varying degrees of wind velocity on said wind velocity meter as said core travels on said dish-shaped member in response to changing velocity of the wind.

References Cited by the Examiner
UNITED STATES PATENTS

| | | | |
|---|---|---|---|
| 2,396,394 | 3/1946 | Shaw | 73—105 |
| 2,586,010 | 2/1952 | Divoll | 73—189 |
| 2,596,030 | 5/1952 | Junkins | 73—112 |
| 2,665,583 | 1/1954 | Anjanos | 73—189 |
| 2,780,937 | 2/1957 | Haynes et al. | 73—189 |
| 2,913,900 | 11/1959 | Andrews | 73—189 |

RICHARD C. QUEISSER, *Primary Examiner.*

J. J. SMITH, *Assistant Examiner.*